Jan. 23, 1968  J. W. CHAIVRE  3,364,806
CAPPED WHEEL NUT
Filed June 13, 1966

INVENTOR
JOSEPH W. CHAIVRE
BY Hauke, Knaus, & Gifford
ATTORNEYS

United States Patent Office 3,364,806
Patented Jan. 23, 1968

3,364,806
CAPPED WHEEL NUT
Joseph William Chaivre, Royal Oak, Mich., assignor to Towne Robinson Fastener Company, Dearborn, Mich., a corporation of Michigan
Filed June 13, 1966, Ser. No. 557,264
3 Claims. (Cl. 85—35)

ABSTRACT OF THE DISCLOSURE

A nut for fastening the wheel of automobile to the axle has polygonal flats and a conical end adapted to mate with a complementary depression on the axle hub. The polygonal flats terminate at the wheel end in a conical chamfer and a short cylindrical land connects the end of this chamfer to the conical end of the nut. A sheet metal cover surrounds the polygonal sides and extends down the conical chamfer to terminate adjacent the intersection with the land. The other end of the cover is domed to receive the extending end of the wheel stud.

Background of the invention

This invention relates to a nut useful for fastening the wheels of an automobile to the axle hubs and more particularly to such a wheel nut which is encased in a decorative and protective cap or sheath extending over the outer exposed surfaces of the nut and formed with a domed section projecting from the outer face of the nut to provide a volume to receive and cover the protruding end of a wheel stud over which the nut is threaded.

Description of the prior art

In the past, the joinder between the wheel nuts and the studs extending out from the axle hub has been protected by a hub cap or wheel cover which attaches to the wheel about the perimeter of the bolt circle. Such covers protect the extending stud ends and nuts from damage and exposure and hide the bolt circle for aesthetic purposes. It has been proposed to eliminate the hub cap or wheel cover and employ decorative steel wheel nuts formed with domed caps to cover the stud sections which extend beyond the nuts. These nuts have been bright plated for corrosion resistance and aesthetic purposes. However, it has been found that the heavy wrench forces exerted on the polygonal faces of the nut inevitably penetrate the plated surfaces at points and permit corrosion to be initiated. For this reason, many consider such nuts to be an unsatisfactory substitute for wheel covers.

Summary of the invention

The present invention contemplates a decorative and corrosion resistant wheel nut formed by encasing a standard steel wheel nut in a sheath or cap formed of sheet stainless material drawn over the nut so as to cover the exposed surfaces thereof when the nut is engaged with a wheel stud, to provide a domed area to receive and cover the extending end of the stud.

The nuts on which the present invention is practiced have a conical surface which is adapted to abut a matching conical depression formed in the wheel surface. When the decorative cap is brought over the conical surface of the nut, it has been found that the somewhat irregular swaged edge of the cap prevents uniform torque from being realized between the nut and the wheel. Accordingly, the present invention contemplates a nut structure wherein the conical surface of the nut which mates with the conical wheel surface is not capped, but rather, the cap terminates short of the conical surface in such a manner that when the nut is engaged with the stud, the seam between the cap and the nut is hidden, with the free edge of the cap abutting, or practically abutting, the outer edge of the conical wheel surface, so as to provide a unitary appearance and effectively seal the gap between the cap and the nut against penetration by foreign material which might initiate corrosion. In order to achieve this, the nut is formed with a cylindrical land immediately adjacent to the radial outer end of the conical nut end. This land is short and merges into a second conical surface formed by the chamfered ends of the wrench flats. The thickness of the cap is such that when the second conical surface is sheathed with the cap, the outer surface of the cap closely approaches the imaginary extension of the first conical surface so that the two practically merge with one another with only a short gap existing between them. The thickness of the sheath must approximate the normal distance between the conical chamfer on the end of the flats and the conical nut end.

This construction allows the nut to be torqued to the wheel in the same manner as an uncapped wheel nut yet provides the corrosion resistance and aesthetic appearance of a completely capped wheel nut.

It is therefore seen to be a primary object of the present invention to provide a sheathed wheel nut of the type having a conical surface adapted to mate with a complementary wheel surface wherein a cylindrical, non-tapered land is formed between the radially outer end of the conical section and the adjacent chamfered end of the wrench flats, and a domed cap is formed over the wrench flats and over the chamfered end terminating adjacent to the cylindrical land.

Another object is to provide such a nut wherein the normal distance between the conical nut section and the chamfer is approximately equal to the thickness of the sheath whereby the cap end generally merges with the conical section.

Other objects, advantages and applications of the present invention will be made apparent by the following detailed description of a preferred embodiment of the invention. The description makes reference to the accompanying drawings.

Figure 1:
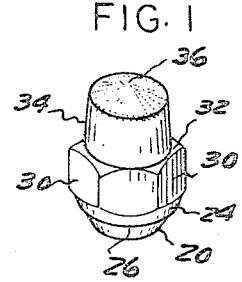
FIG. 1 is a perspective view of a capped wheel nut formed in accordance with the present invention.
Figure 2:
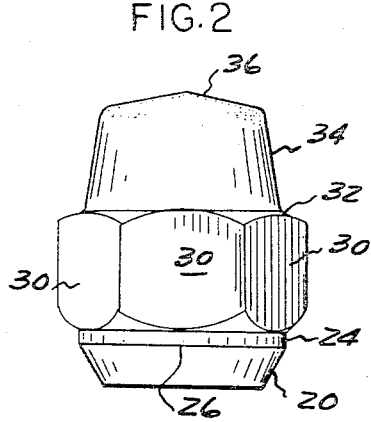
FIG. 2 is a side view of the preferred embodiment of the wheel nut.
Figure 4:
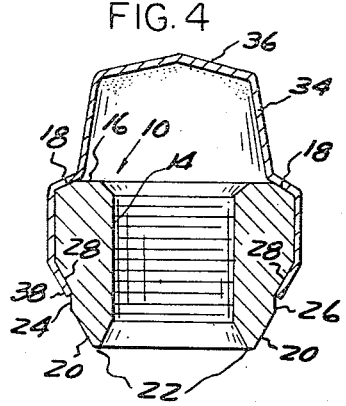
FIG. 4 is a vertical section through the wheel nut taken along line 4—4 of FIG. 3 through the line of joinder of pairs of oppositely disposed wrench flats.
Figure 3:
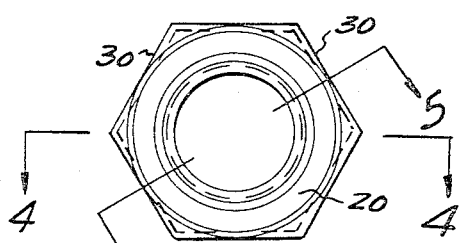
FIG. 3 is a top view of the wheel nut.

Referring to the drawings, the preferred embodiment of the present invention is formed about a nut, generally indicated at 10, made of a low carbon steel. The central portion of the body of the nut is hexagonal in shape and includes a plurality of planar faces 12 which act as wrench flats for tightening or loosening the nut. A central hole 14 through the nut body is formed with internal threads. The outer or upper end of the nut 10 is formed with a flat 16 extending transversely to the central axis and the lines of joinder between the adjacent flats 12 are formed with chamfers 18 that merge with the end section 16. The opposite, or inner end of the nut is formed with a conical section 20 which joins the inner hole 14 and the short flat section 22.

At its radially outer end, the conical section 20 intersects a cylindrical land 24 at a line of merger 26. The cylindrical land 24 terminates at the lower end of the wrench flats 12 and is joined to them by a chamfer 28 which has a curvilinear edge and a minimum height at the center of the wrench flats and maximum height at the line of intersection between two wrench flats. The cone formed by an imaginary projection of the conical section 20 beyond its radially outer end would therefore encompass the cone of the chamfer 28. The angle of the conical section 20 is identical with that of the chamfer 28 so that their surfaces lie parallel to one another. In a preferred embodiment of the invention, both the conical section 20 and the chamfer 30 are formed at 60 degree angles and the length of the flat is such that the two parallel surfaces are normally separated by approximately .030 inch. This dimension has a special significance as will be subsequently noted.

The sheath or cap for the nut is formed of a stainless steel such as SAE 430. I have determined by research and experimentation that the thickness of the metal used to form the sheath must lie between 0.015 and 0.030 inch. Use of a stainless steel sheath thinner than those contained within this range will often produce a rupture of the sheet during the drawing process or will provide a sheath so thin that wrench forces may tear it. Use of a sheet stock thicker than those contained within this range is not only economically undesirable but may also result in various drawing problems.

The sheet has sides 30 which extend over the flat faces 12 of the nut, and polygonal flats 32 which cover the chamfer sections 18. A domed section having cylindrical sides 34 and a mildly pointed conical cap 36 extends symmetrically above the nut face 16 just beyond the central bore 14. The cap serves to cover the end of a stud which may protrude from the nut in a particular wheel application but is primarily provided for decorative purposes. For example on a ½–20 standard wheel nut the internal side of the cap may extend perhaps 0.15 inch beyond the nut face 16. The faces 34 may be gently tapered for appearance purposes.

The lower end of the cap surrounds the chamfer 28 and terminates in a straight circumferential line 38 adjacent to the junction between the chamfer 28 and the cylindrical land 24. The cap is formed onto the nut by a swaging process and the pressure of the swage tends to extend the outer surface of the lower edge of the cap slightly over the cylindrical land 24, to a point just short of the intersection 26 between the cylindrical land and conical section 20. Since the normal distance between an extension of the conical section 20 and the chamfered conical section 28 is about .030 inch and the thickness of the sheath or cap is somewhat less than .030 inch after it is drawn over the nut, the line forming the outer side of the cap as it extends over the chamfered surface 28 is almost an extension of the edge of the conical section 20. The gap betwen them is minimized by the swaging of the cap over the nut so that almost not space is left between the two.

Figure 6:
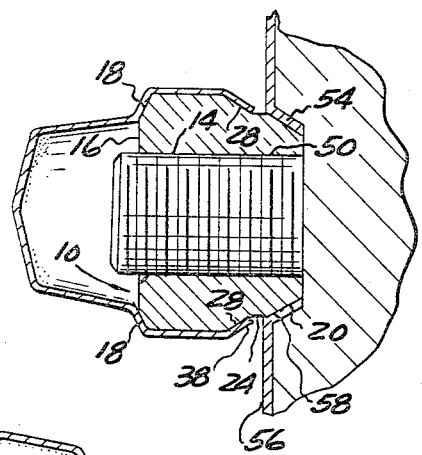
FIG. 6 is a sectional view through the preferred embodiment of the capped wheel nut in disposition on a wheel stud.
Figure 5:
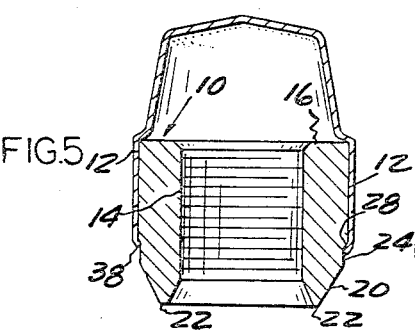
FIG. 5 is a vertical sectional view taken along line 5—5 of FIG. 3 at an angle with respect to line 4—4 so as to be through the centers of the pair of oppositely disposed wrench flats.

The manner in which the sheathed wheel nut formed in accordance with the present invention is applied to a wheel stud is illustrated in FIG. 6. The stud 50 extends from the center of an inwardly dished conical section 54 formed on the hub 52. A wheel 56 to be attached to the hub has a plurality of similar regularly spaced depressions 58 one of which is shown in FIG. 6. The conical depression 58 on the wheel has a form complementary to the outer dimensions of the conical section 20 of the wheel nut. The wheel 56 is aligned with the hub 52 so that the conical depression 58 fits within the inwardly dished section 54 of the hub. The nut formed in accordance with the present invention is then applied to the stud 50 with a central threaded section 14 mating with the threads of the stud. The end 60 of the stud will sometimes extend slightly beyond the upper face 16 of the nut. This extension is housed within the domed sheath section 34–36.

When the nut is tightened on the stud 60 the wheel 56 is secured to the hub 52. At the same time, the conical end of the nut 20 is brought into contact with the corresponding section 58 of the wheel. The depth of the depression 58 is approximately equal to the depth of the conical section 20 so that the conical section is largely seated within the depression. Thus, when the bolt is fully seated, the lower end 38 of the cap is very closely spaced from the adjacent surface of the wheel 56. In appearance, the nut is unitary and the portion below the sheath is invisible. At the same time, an intimate contact may be formed between the nut itself and the wheel without the interference of the sheath. Very little space is available for the entrance of moisture or foreign matter between the sheath and the nut.

Having thus described my invention I claim:

1. A nut for use with a wheel having a central hole through which a study may project and a conical depression surrounding such hole comprising: a nut body having a central threaded hole, polygonal flat sides terminating at one end in a conical chamfer, a cylindrical land formed adjacent to the chamfer and a conical end having the same angle as the conical chamfer formed adajcent to the cylindrical land at the outer extremity of said one end, said conical end being adapted to mate with the conical depression in the wheel: and a sheet material sheath for the nut including side members in close proximity to the polygonal sides, and extending down the conical chamfer and terminating adjacent to the intersection with the land, and a domed cap extending centrally from the opposite end of the nut body and spaced therefrom to receive the extending end of said stud.

2. The nut of claim 1 wherein the length of the cylindrical land is such that the normal distance between an extension of the envelope of the conical end of the nut and the conical chamfer is very small.

3. The nut of claim 2 wherein the thickness of the sheath is such that the outer surface of the sheath surrounding the conical chamfer closely parallels the conical surface of the nut end.

References Cited

UNITED STATES PATENTS

| | | | |
|---|---|---|---|
| 1,166,722 | 1/1916 | Stanley | 85—35 |
| 1,727,590 | 9/1929 | Ferry | 85—35 |
| 2,018,301 | 10/1935 | Ferry | 85—35 |
| 2,694,997 | 11/1954 | Alger | 85—55 |
| 3,135,558 | 6/1964 | Johnson et al. | 85—53 |

FOREIGN PATENTS 1,176,415  11/1958  France.

CARL W. TOMLIN, *Primary Examiner.*

R. S. BRITTS, *Assistant Examiner.*